United States Patent [19]
Grüne et al.

[11] Patent Number: 6,087,033
[45] Date of Patent: Jul. 11, 2000

[54] FUEL CELLS AND BATTERIES MADE THEREOF

[75] Inventors: Horst Grüne, Röttenbach; Peter Buchner, Heiligenstadt, both of Germany

[73] Assignee: Siemens Aktiengesellschaft, Munich, Germany

[21] Appl. No.: 08/849,140

[22] PCT Filed: Nov. 17, 1995

[86] PCT No.: PCT/DE95/01603

§ 371 Date: May 28, 1997

§ 102(e) Date: May 28, 1997

[87] PCT Pub. No.: WO96/17396

PCT Pub. Date: Jun. 6, 1996

[30] Foreign Application Priority Data

Nov. 28, 1994 [DE] Germany .............................. 44 42 285

[51] Int. Cl.⁷ ................................................... H01M 8/04
[52] U.S. Cl. .................................. 429/37; 429/26; 429/39
[58] Field of Search .............................. 429/26, 35, 36, 429/37, 38

[56] References Cited

U.S. PATENT DOCUMENTS

| | | | |
|---|---|---|---|
| 3,573,104 | 3/1971 | Snyder et al. .......................... | 136/86 |
| 4,609,595 | 9/1986 | Nickols .................................. | 429/35 |
| 4,997,727 | 3/1991 | Bossel .................................. | 429/35 X |
| 5,084,364 | 1/1992 | Quaadvliet ............................. | 429/38 X |
| 5,424,144 | 6/1995 | Woods .................................. | 429/35 |
| 5,543,241 | 8/1996 | Nishioka et al. ....................... | 429/35 X |
| 5,686,200 | 11/1997 | Barton et al. ........................ | 429/37 |

FOREIGN PATENT DOCUMENTS

| | | |
|---|---|---|
| 0 329 161 | 8/1989 | European Pat. Off. . |
| 0 397 072 | 11/1990 | European Pat. Off. . |
| 61-161671 | 7/1986 | Japan . |
| 62-139271 | 6/1987 | Japan . |
| 62-272469 | 11/1987 | Japan . |
| 63-269458 | 11/1988 | Japan . |

OTHER PUBLICATIONS

"Fuel Cell Technology And Applications," International Seminar, The Netherlands, Oct. 26–29, 1987, Extended Abstracts, pp. 209–218.

Vielstich, W., "Brennstoffelemente," Verlag Chemie–GmbH, 1965, pp. 171, 201/202, Month NLA.

VDI–Berichte Nr. 912 (1992), pp. 125–145, Month unknown.

*Primary Examiner*—Stephen Kalafut
*Attorney, Agent, or Firm*—Kenyon & Kenyon

[57] ABSTRACT

Fuel cells, each having a negative pole flange, a negative electrode, a membrane, a positive electrode, and a positive pole flange with at least four through openings for feed and discharge, are characterized in that the negative pole flange (21), the membrane (24), and the positive pole flange (26) are clamped together at the edges by a frame element (28) in a mechanically firm, gas-tight, and electronically insulating manner.

17 Claims, 4 Drawing Sheets

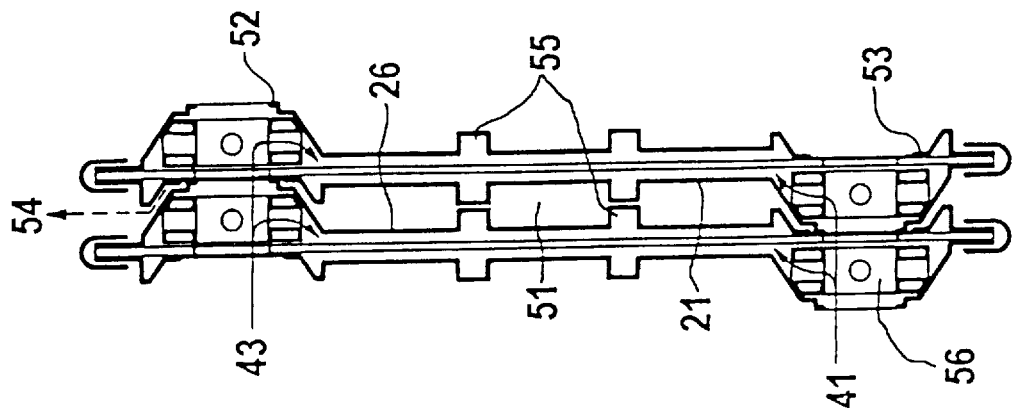
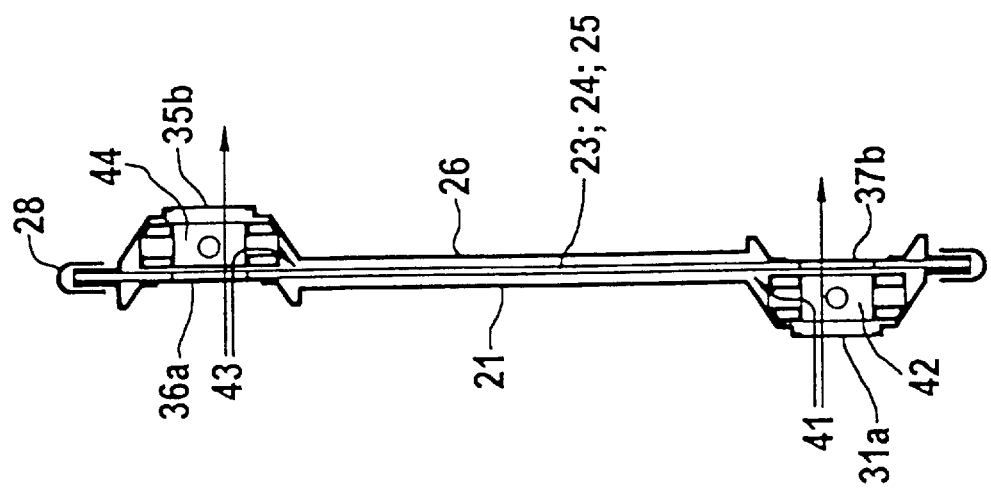

FUEL CELLS AND BATTERIES MADE THEREOF

BACKGROUND OF THE INVENTION

The invention concerns fuel cells, each having a negative pole flange, a negative electrode, a membrane, a positive electrode, and a positive pole flange with at least four lead-through openings for feed and discharge, as well as batteries made of such fuel cells.

Hydrogen/oxygen and hydrogen/air fuel cells deliver a voltage of approximately 1 V. Since this voltage is far too low for practical applications, a plurality of individual cells must be connected electrically in series to obtain the voltage required, for example, for operating motors or electronic systems. These sets of electrically connected individual cells are referred to as "fuel cell stacks."

It is known and customary to manufacture such stacks by repeatedly stacking the individual components of fuel cells and mechanically clamping them together using threaded bolts or other fasteners. Thus, for example, it is also known that the required forces can be produced hydraulically or pneumatically, as is done according to what is usually referred to as "filter press technology" (see e.g., W. Vielstich "Brennstoffelemente" [Fuel Elements], Verlag Chemie GmbH, 1965, pp. 171 and 201–202). By mechanically compressing the stack, all the edges of the individual fuel cells, as well as the required feed-throughs for the operating gases and for any coolant, are sealed. The following pairs of media must be reliably separated using gaskets: hydrogen/oxygen (air), hydrogen/atmosphere, oxygen/atmosphere, and electrolyte/atmosphere, as well as hydrogen/coolant and oxygen/coolant, when a coolant is used. When a liquid coolant is used, it must also be hermetically sealed against the atmosphere. On the other hand, when using air as a coolant, it is desirable to have the least possible hindered exchange with the atmosphere.

The basic components of a fuel cell are—in the order of assembly—the following (see FIG. 1): an electronically conductive contact plate (11) forming the negative pole of the individual cell (10) with devices (channels or bores) for distributing hydrogen (12), a porous hydrogen electrode (13), a porous electrolyte carrier (14), a porous oxygen or air electrode (15), and an electronically conductive contact plate (16) forming the positive pole of the individual cell with devices (channels or bores) for distributing oxygen or air (17). The porous electrolyte carrier (14) is soaked with liquid electrolyte before or after assembly. An ion exchange membrane can also be used as a porous electrolyte carrier in particular. Fuel cells equipped with such membranes, called PEM (Proton Exchange Membrane or Polymer Electrolyte Membrane) fuel cells, are considered especially promising energy sources for automobile engines (see: VDI Report No. 912 (1992), pp. 125–145).

In the known fuel cell stack designs, there are individual contact plates (11 and 16) only at the positive and negative ends of the stack. The contact plates inside the stack are combined to form "bipolar plates," which often have a hollow design. A coolant may flow through such contact plates, in which case they are referred to as cooling plates. Bipolar plates are therefore a typical element of the known fuel cell stack designs.

Among the previously mentioned sealing points the most critical by far is the separation of hydrogen from oxygen. If this seal is faulty, hydrogen may come in contact with the oxygen or air electrode, or oxygen (air) may come in contact with the hydrogen electrode. In either case, combustible gas mixtures are formed, which are likely to be catalytically ignited by the electrode materials, which may result in the destruction of the entire stack. Therefore, for safety reasons, the cells and stacks must be designed so that direct hydrogen/oxygen (air) seals are avoided. In a cell that is properly designed in this respect, hydrogen and oxygen escape to the atmosphere if a seal is defective. If there are no sources of ignition there, no danger is present. Although this can be achieved using filter press technology for edge sealing by having the membranes extend into the atmosphere, there is the risk of the membranes drying out at the edges, which may result in considerable corrosion problems and—after extended shutdown periods—also to operating problems. These sealing problems normally occur not only at the cell edges, but also at the cell-to-cell feedthroughs.

An important disadvantage of filter press technology consists of the fact that the dimensional tolerance requirements for the edge seals are very strict or only highly elastic materials can be used, which require complicated processing and also have numerous other disadvantages. Furthermore, this technology has the disadvantage that all sealing surfaces are produced simultaneously when the stack is assembled. When sealing defects occur, they can only be located using special procedures. In addition, fittings of only relatively small cross sections can be used with filter press technology to supply the cells with reactants and coolant. In particular, the wide flow channels required for air cooling are almost impossible to implement. On the other hand, when liquid coolant is used, electrochemical corrosion at the required high operating voltages, e.g., 200 V, is difficult or impossible to control.

SUMMARY OF THE INVENTION

The object of the invention is to provide fuel cells of the type referred to in the preamble, with a negative pole flange, a negative electrode, a membrane, a positive electrode, and a positive pole flange, so that mass production methods can be used, in particular for manufacturing low-temperature fuel cell stacks for electric automotive motors. The invention should eliminate all the problems previously associated with filter press technology.

This is achieved according to the invention by clamping the negative pole flange, the membrane, and the positive pole flange together in a mechanically firm, gas-tight and electronically insulating manner at the edge using a frame element. The two pole flanges, the two electrodes, and the membrane thus form a closed, easy-to-handle unit.

In addition to fuel cells, the invention also concerns stacks comprised of a plurality of mechanically connected fuel cells of the aforementioned type electrically connected in series.

The present invention allows fuel cells that are hermetically sealed at the edge and can be operated or tested individually to be manufactured, with the advantage that this can be done by simple and rapid manufacturing procedures, such as stamping and punching. Another advantage is represented by the fact that the operating gases cannot mix within the cells due to defective sealing. Any number of individual cells can be stacked with the required intermediary seals forming automatically, i.e., no additional gasket material is required.

The object of the invention can be used to particular advantage in PEM fuel cells and respective fuel cell stacks; the electrolyte carrier is therefore referred to, in a simplified manner, as a membrane in this application. The invention is not, however, limited to these types of cell or stack, but can also be used for other types, for example in alkaline hydrogen/oxygen matrix cells and methanol/air cells and the respective cell stacks.

The fuel cells and stacks according to the invention offer the following advantages, in particular compared with cells and stacks made by the filter press technology:

The problem of reliable prevention of direct contact between different gases and, at the same time, that of dried-out membranes is solved in a simple manner.

In stacks, no sealing problems occur at cell-to-cell lead-throughs.

The thickness tolerance of the individual components of the fuel cells and stacks is completely non-critical, neither are highly elastic materials needed for their design. In addition, no additional gasket material is required besides the membranes.

All sealing points of the stacks are accessible from the outside, so that leaks are easily located, for example, using soap foam. In addition, the cell edge seals can be tested even prior to the assembly of the stack and defective cells can be discarded at an early stage. Since, contrary to the design by the filter press technology, operational cells are present even prior to assembly, other function tests can also be performed on the individual cells, which considerably simplifies quality control.

The stacks can be manufactured in a form that allows the individual cells to be evenly cooled by air, with the resistance to flow kept low in a manner similar to modern automobile coolers, for example. Although the stacks according to the invention are especially advantageously suited for the use of direct air cooling, they can also be liquid cooled.

BRIEF DESCRIPTION OF THE DRAWINGS

FIG. 4 is a cross-section of a single cell according to the present invention.

FIG. 5 is a cross-section of two cells according to the present invention, stacked together.

DETAILED DESCRIPTION OF THE INVENTION

Figure 2:
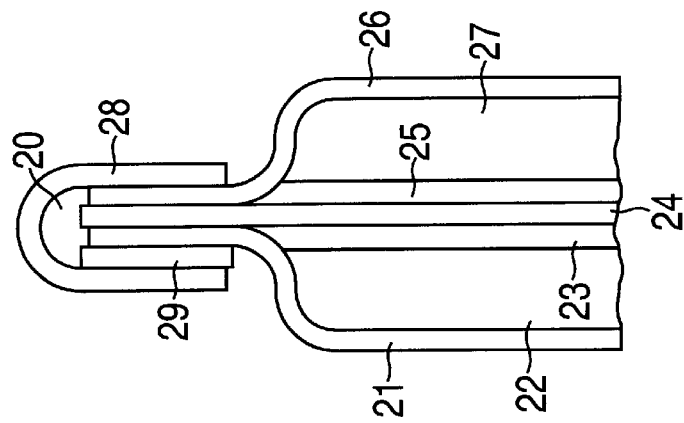
FIG. 2 shows the edge sealing structure of the fuel cell of the present invention.
Figure 1:
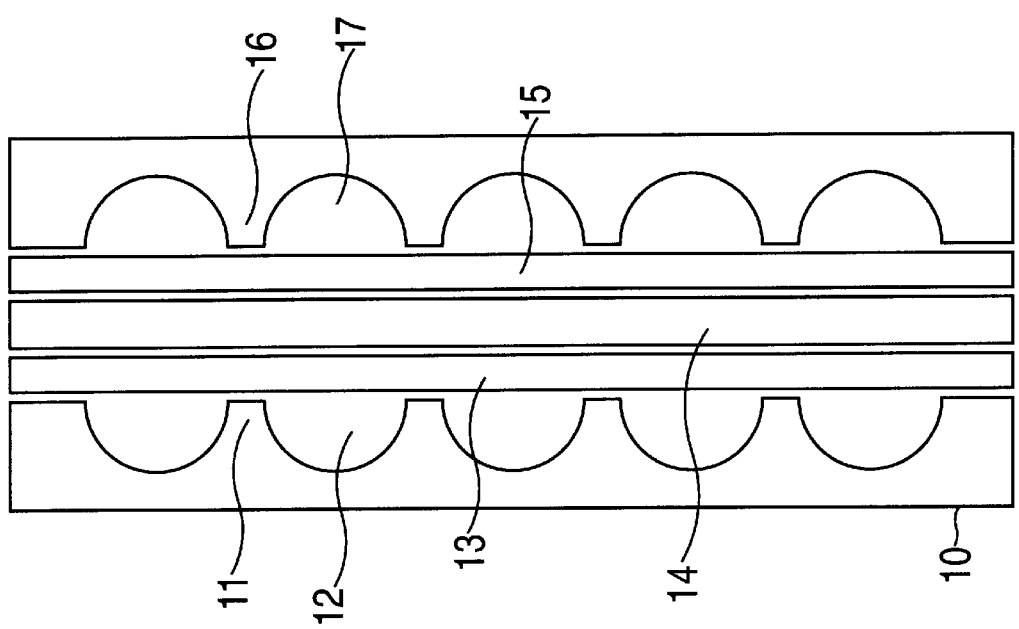
FIG. 1 shows the basic components of a prior art fuel cell.

The fuel cells according to the invention have no bipolar plates. Each set of elements forms one individual cell, i.e., a fully functional unit. As FIG. 2 schematically shows in a simplified cross section, these elements are the following: negative pole flange (21), gas space (22), negative electrode (23), membrane (24), positive electrode (25), positive pole flange (26), and gas space (27). These elements are held together by a frame element (28), which secures the entire periphery of a cell.

The frame elements can be made of a single piece, but can, for example, also be made of four parts, with each part securing one edge of a rectangular or square-shaped cell. The frame element preferably has a U-shaped cross section with the two legs of the U pressing together the negative pole flange (21), the membrane (24), and the positive pole flange (26) at the edges, so that the inside of the cell is hermetically sealed against the atmosphere. The U shape also prevents larger amounts of moisture from evaporating from the edge area into the atmosphere. This ensures restarting without problems after an extended shutdown period and eliminates the danger of crevice corrosion of the pole flanges. If water evaporated into the atmosphere in the form of vapor, diluted acids almost always present in the edge area could become concentrated and corrode the pole flanges (21 and 26) in the sealing gap. The present invention thus allows less corrosion-resistant and therefore less expensive materials to be used.

Another important advantage of the fuel cells according to the invention compared to all known designs is that each cell has its own edge sealing, i.e., the properties of adjacent cells in the stack can in no way affect the quality and reliability of the seal. On the other hand, in the case of filter press technology, the edge sealing forces must be transmitted all the way from one end of the stack to the other. Variations in thickness of the components (contact plates and membranes) are added and may result in an inadmissibly high overall tolerance, especially in stacks with a large number of cells, so that edge sealing is no longer possible. In the autonomous sealing method according to the invention, there are no tolerance requirements concerning thicknesses beyond those that already exist for semifinished, commercially sold materials (metal sheets, membranes).

In the fuel cells according to the invention, the frame element (28) has no sealing function whatsoever, which would be undesirable, since in the case of defective sealing all the operating gases under pressure could be released into the atmosphere. This can be achieved by not joining the individual pieces of the frame tightly together, which also simplifies manufacturing.

The electrodes (23) and (25) should overlap the membrane (24) only up to the sealing area within the U shape. Greater overlapping is, however, acceptable if the porous electrodes are compressed in the edge area prior to assembly or by the sealing forces proper. This considerably simplifies the membrane/electrode manufacturing process, because no masking is needed when coating the membrane with electrode material.

The frame element (28) may not connect the negative pole flange (21) with the positive pole plate (26) in an electronically conductive manner, since this would cause the power-generating cell to short-circuit. It can therefore be made of an insulating material such as plastic. The frame element (28) can also advantageously be made of metal with an additional electronically insulating layer; this insulating layer can be designed as a coating of the frame element. One preferred option consists of at least one of the pole flanges (21 or 26) having an electronically insulating layer (29) on the edge outside the cell, which layer can be designed as a coating of the pole flange. The material requirements for the insulation are met by most plastics, since no sealing function is required here. The U shape, i.e., the frame element (28) can then be made of a metal sheet, which is to be preferred due to its better elastic and strength properties. The frame element (28) can be, however, also designed by making one pole flange larger than the other, and the uncovered edge is folded over the edge of the other pole flange during the assembly of the cell; crimping also provides more reliable mechanical joints. The frame element thus becomes almost an integral part of one of the two pole flanges, however, requiring a suitable insulation.

The frame element (28) is advantageously configured so that a small cavity (20) remains in the inside of the U shape.

This cavity serves to conduct the pressurized operating gases into the atmosphere in the case of a sealing defect, i.e., acts as a gas discharge channel. This ensures that a reaction gas cannot get under the other pole flange, i.e., in the gas space of the other reaction gas. Carbon materials such as graphite sheets are well-suited as pole flange materials. Metal sheets, specifically with a thickness between 0.05 and 0.2 mm, preferably with a thickness of 0.1 mm, advantageously serve as pole flanges.

An actual cell with pole flanges stamped from metal sheets will be described below as an example. The invention is not, however, limited to such pole flanges, and the material flows described hereunder can also be configured in a different manner.

Figure 3:
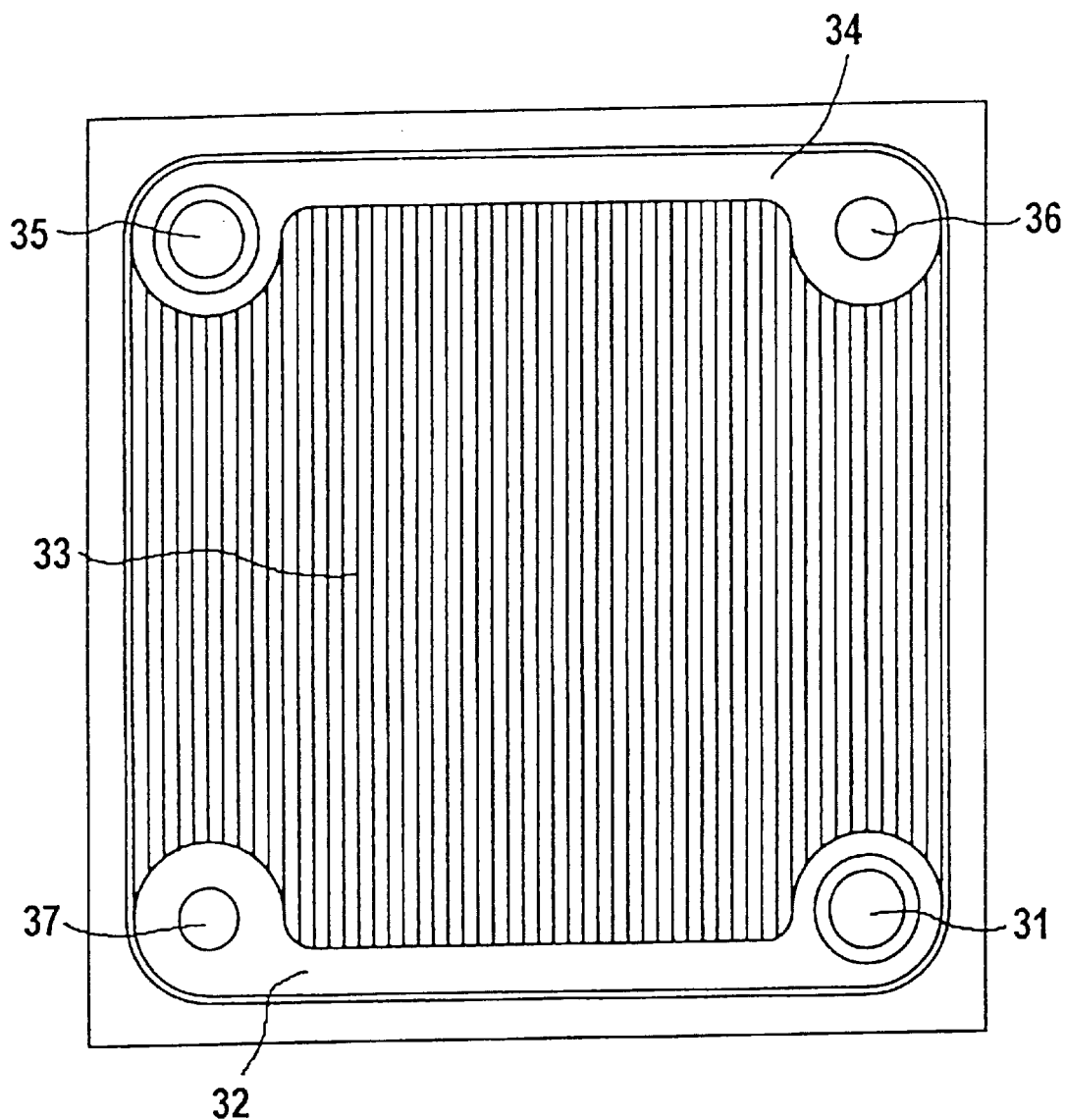
FIG. 3 is a top view of the present fuel cell, inside its pole flange.

Stainless steel plates with a thickness of 0.1 mm are stamped and punched for manufacturing pole flanges so that a shape as shown in FIG. 3 results; FIG. 3 is the top view on the inside of a pole flange. The negative and positive pole flanges have identical designs.

During the operation of a cell, reaction gas, for example, hydrogen or a gas mixture containing hydrogen, flows through a feed opening (31) in the pole flange, which is then the negative pole flange, into the corresponding gas space, reaching every point of the electrode over a relatively wide supply channel (32) and relatively narrow distribution channels (33). As the reaction gas reacts, inert components are enriched and leave the gas space over a manifold (34) and a discharge opening (35). The pole flange also has lead-throughs (36 and 37). A cell is similarly supplied with oxygen or air through a positive pole flange.

A negative pole flange (21) and a positive pole flange (26) are combined with electrodes (23 and 25) and membrane (24) to form an individual cell as schematically shown in a cross-section in FIG. 4, with the insides of the pole flanges adjacent to one another; they are held together mechanically by the frame element (28). Hydrogen enters into the cell at (41) via the top feed opening (31a) of the negative pole flange (21). It flows through a support ring (42) having an axial bore and a plurality of radial bores. Part of the hydrogen leaves the cell axially through an opening in the membrane and the lead-through opening (37b) of the positive pole flange (26) and can be used for feeding other cells. A partial stream reaches the channel system of the negative pole flange (21) via the radial bores.

Oxygen supply takes place in a similar manner. Oxygen enters the cell at (43) via the feed-through opening (36a) of the negative pole flange (21) and an opening in the membrane, and flows through a support ring (44) into the top discharge opening (35b) of the positive pole flange (26). The support ring (44) also has an axial bore and a plurality of radial bores.

The disposal or discharge system of the cells is designed in a manner similar to the supply or feed system (see FIG. 3: "a" denotes features of the negative pole flange, "b" denotes features of the positive pole flange). The discharge opening (35a) in the negative pole flange (26) and the feed-through opening (36b) in the positive pole flange (21) for hydrogen, as well as the feed-through opening (37a) in the negative pole flange (21) and the discharge opening (31b) in the positive pole flange (26) for oxygen serve this purpose. This requires two additional support rings, one in each of the two top openings (35a) and (31b). Otherwise it makes no difference whether feed into and discharge from the cells take place from the right or left side, i.e., the feed and discharge openings can also be used as feed-through openings and vice-versa.

The support rings can be made of metal or plastic. Their manufacture is particularly simple and inexpensive if each ring is made of a flat, an undulated, and another flat support disk. This shape allows for very small flow resistance combined with small overall height. The efficiency of the overall system is thus barely affected by internal pressure drops, which otherwise can be critical, especially when operating with air.

The cell surface may also have a rectangular design or a complex shape. Gas can also be distributed within the cell by means other than stamped-in channels, for example, through built-in barriers such as meshes and sieves. The negative pole flange and the positive pole flange can also have different shapes. The two reaction gases can be conducted in different manners one in relation to the other, for example, in countercurrent, parallel current or cross-current.

The fuel cells according to the invention are used for making fuel cell stacks. An electrical series circuit, together with a common gas-tight feed and discharge system, is obtained by stacking the cells. Also here, the requirements that no additional gasket materials be used and that a gasket failure not cause the operating gases to mix in either pole flange are met.

The negative and the positive pole flange are advantageously provided with matching hills and valleys, so that their relative positions are fixed when the cells are stacked. Preferably, the pole flanges are geometrically designed in the immediate vicinity of the feed and discharge openings so that when two cells are stacked, together with the membrane of one of the two cells, two ring-shaped concentric sealing areas are obtained, so that no pressurized gas can escape from the gas spaces into the atmosphere.

FIG. 5 schematically shows the cross section of two individual stacked cells working together; only two of the total of four gas feed-throughs (41, 43) are visible. The positive pole flange (26) of the left-hand cell has a direct ring-shaped mechanical and electronic contact with the negative pole flange (21) of the right-hand cell around the four feed-throughs. Thus the two cells are electrically connected in series. A clearance (51) remains between the cells, through which a coolant can flow in any selectable direction. The extraordinarily good accessibility of this clearance is especially advantageous with direct air cooling; in addition, the flow resistance can be kept very low. Therefore, when used in automobiles, the air flow is sufficient to remove the waste heat under partial loads; otherwise a small additional blower with low energy consumption is required.

All feed-throughs in the pole flanges are surrounded by a ring-shaped sealing lip. The top feed-throughs have a sealing lip (52) with a relatively small diameter; the flat feed-throughs (53) are surrounded by sealing lips of a somewhat larger diameter. When stacked, one sealing lip (53) of one cell and one sealing lip (52) of the adjacent cell concentrically press on the membrane with a support ring (56) serving as a mechanical abutment. This prevents both operating gases from escaping into the atmosphere. Should any gas escape nevertheless due to a fault or a defect, the gas is removed directly to the atmosphere at (54), since the ring-shaped clearance between the two concentric sealing areas is connected to the atmosphere through a narrow gap. As in the case of edge sealing, passage to the pole flange of the adjacent cell is not possible. The membrane is prevented from drying out by the narrow design of the gap at (54).

As FIG. 5 shows, the vicinity of the feed-throughs may have the shape of a truncated cone. The individual cells are thus force-fitted to each other, which considerably simplifies the stacking procedure. These cell areas can, however, also have the shape of a plug or a pushbutton. This helps achieve a better electric contact, as well as a mechanical bond between the cells.

Figure 6:
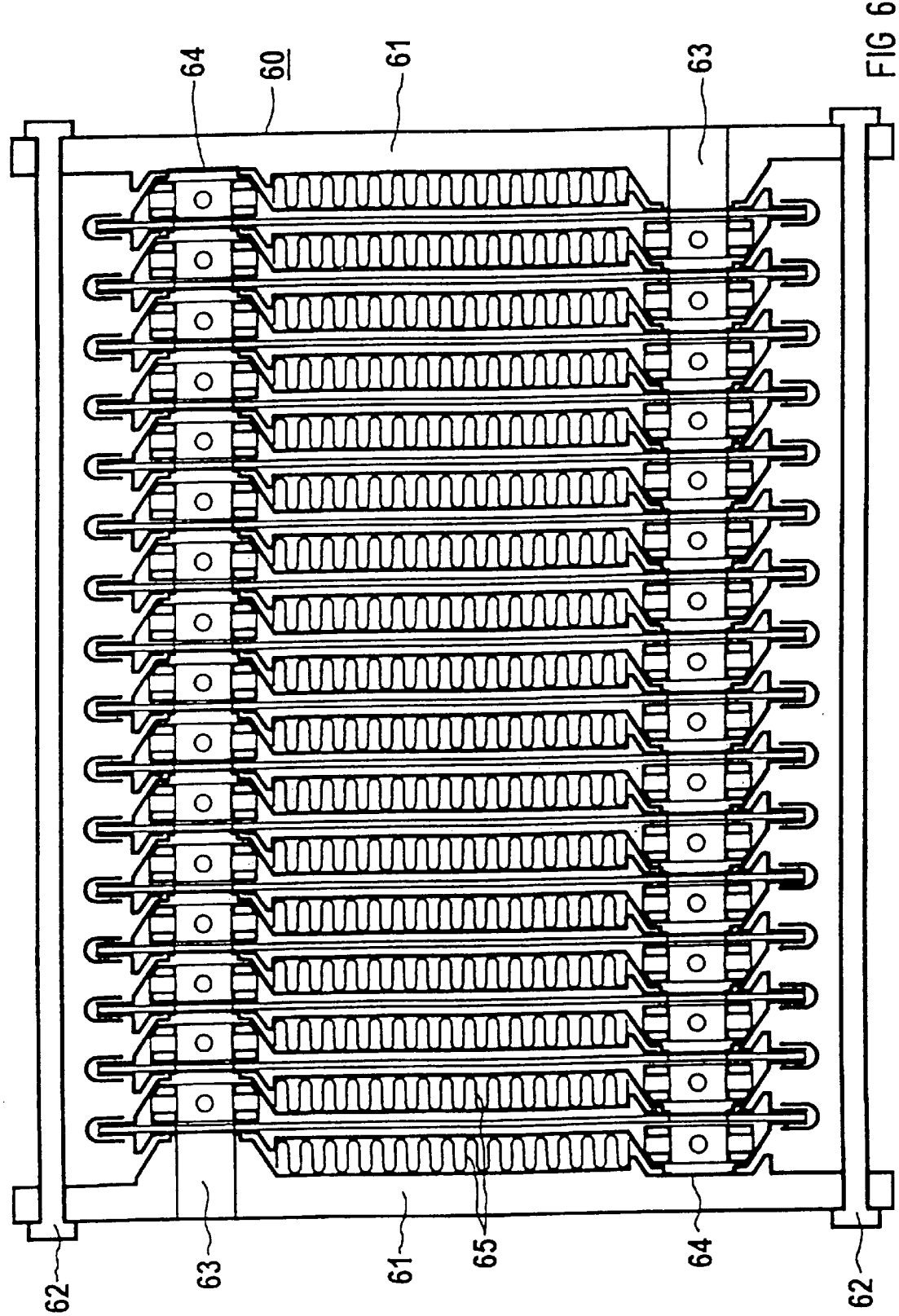
FIG. 6 is cross-section of a complete stack of cells according to the present invention.

The pole flanges can also be provided with elevations (55), which may be button-shaped, for example. These elevations can have three functions, in particular in large-surface cells: They can increase the overall stability of the stack, for example, their vibration resistance; they can also increase the internal compression of the cells, which may be required depending on the selection of electrode materials and operating pressures; in addition, they may shorten the length of the flow paths in the pole flanges. A number of cells according to the invention are stacked in the manner described above to form a fuel cell stack. FIG. 6 schematically shows the cross section of a 16-cell stack (60). The feed and discharge channels are located vertically one on top of the other, forming two through channels for feeding, and discharging from, all the cells. These channels can be connected to the feed or discharge devices on the right or left side of the stack, independently of one another. The unneeded openings can be closed later, or suitably closed end cells can be used.

The necessary sealing pressure at the points of connection is produced by a clamping device common to all cells, for example, in the form of end plates (61) and bolts (62). The bolts can be located outside and along the cells as FIG. 6 shows, but they can also be located in special bores or openings in the cells or also in the feed and discharge channels. In contrast to filter press technology, the clamping device can be implemented in a relatively simple, light-weight and inexpensive manner, since edge sealing of the cells, which requires far higher forces, is performed by the frame elements.

Bores (63) in the end plates (61) are used for feeding, and discharging from, the stack. As FIG. 6 shows, by having the end plates shaped to match the individual cells, it can be achieved that no additional gasketing is needed at those points, since the end cell membranes perform the sealing function. If end cells closed at (64) are used, no gasket material is required for the entire stack.

The outer surface of the pole flanges is advantageously designed so that gaps and cavities, through which a liquid or gaseous coolant can flow, are obtained between the individual cells. As explained above, electrochemical corrosion problems can occur at high stack voltages when using liquid coolants; these problems cannot be solved long-term at an acceptable cost. The stack design described above is therefore intended mainly for air cooling. The stack according to the invention is particularly well-suited for air cooling also because the entire cell surface is easily accessible and can be reached by the air stream without having to overcome bottlenecks such as channels and bores.

Heat transfer from the cells to the cooling air is considerably facilitated if the cell surfaces are provided with cooling ribs; they increase the effective surface by a factor of 10 or more. In practice, this can be achieved in a simple manner by arranging an intermediate element (65) between two cells, as shown in FIG. 6 (elevations (55) are not used in this case). The intermediate elements (65) can be undulated or embossed metal sheets, but they can also be made of woven, interlaced, or knitted wires, i.e., wire fabric. The intermediate elements can also be permanently attached to one of the two pole flanges; the intermediate elements advantageously have elastic properties.

The intermediate elements do not extend over the entire cell surface, but rather the sealing surfaces for the feed-throughs remain in direct contact with one another. These feed-throughs are drawn further out of the pole flanges through more pronounced stamping, so that the necessary room for the intermediate elements is created. This further facilitates, to a great extent, the transport of gases and water within the cells. The thickness of the support rings is greater, so the flow resistance of the radial channels in the rings is substantially reduced, since it is inversely proportional to the fourth power of the channel diameter. The capillary pressure of water is also reduced, which reduces the risk of channels being blocked by water droplets.

In membrane fuel cells there is the problem that, while a total thickness of only 1 mm is required for an operational cell, no reactant feed-throughs that are safe from blockage by small particles and have a sufficiently low flow resistance can be implemented in such a thin layer. In the fuel cells according to the invention, for example, for an average cell thickness of 4 mm, a channel diameter of 3 mm is possible, while 3 mm of the layer thickness are more efficiently used for direct air cooling, so that no valuable space is wasted.

The intermediate elements can also perform other functions. Thus, they can provide electrical contacts for the electric series connection of the cells, so that the current path is shorter and the voltage loss is smaller, which may be important depending on the size and electronic conductivity of the cells. On the other hand, the intermediate elements can improve the mutual support of the cells, so that the pole flanges can be made of very thin metal sheets, which results in a gross weight reduction.

All parts of the fuel cells according to the invention can be manufactured from blanks by pressing and punching. These are operations requiring only a fraction of a second. Assembly is also extremely quick and easy to accomplish, so that the prerequisites of mass production are met. Subsequent repairs can be easily made by replacing defective cells. Other malfunctioning cells can be easily detected by voltage measurements or leak tests thanks to their easy accessibility. Therefore fuel cell stacks according to the invention are easy to maintain.

What is claimed is:

1. A fuel cell comprising: a negative pole flange, a negative electrode, a membrane, a positive electrode, and a positive pole flange, the fuel cell having at least four through openings for feed and discharge, wherein the negative pole flange (21), the membrane (24), and the positive pole flange (26) are clamped together at the edges by a frame element (28) in a mechanically firm, gas-tight, and electronically insulating manner, and wherein the through openings are disposed substantially perpendicular to the membrane.

2. The fuel cell according to claim 1, wherein the frame element (28) has a U-shaped cross section having two legs of the U pressing against the two pole flanges (21 and 26) from the outside.

3. The fuel cell according to claim 1, wherein the frame element (28) has a gas discharge channel (20), which communicates with the atmosphere at at least one point.

4. The fuel cell according to claim 2, wherein the frame element (28) has a gas discharge channel (20), which communicates with the atmosphere at at least one point.

5. The fuel cell according to claim 1, wherein the frame element (28) is made of metal, and wherein an additional electronically insulating layer (29) is present.

6. The fuel cell according to claim 2, wherein the frame element (28) is made of metal, and wherein an additional electronically insulating layer (29) is present.

7. The fuel cell according to claim 3, wherein the frame element (28) is made of metal, and wherein an additional electronically insulating layer (29) is present.

8. The fuel cell according to claim 5, wherein the electronically insulating layer (29) is configured as a coating of at least one of the two pole flanges (21, 26).

9. The fuel cell according to claim 1, wherein the frame element (28) is an integral part of one of the two pole flanges (21, 26) and surrounds the other pole flange at the edge.

10. The fuel cell according to claim 2, wherein the frame element (28) is an integral part of one of the two pole flanges (21, 26) and surrounds the other pole flange at the edge.

11. The fuel cell according to claim 1, wherein the negative pole flange (21) and the positive pole flange (26) are provided with matching hills and valleys (42,44) on the outside so that the position of the cells is fixed when a plurality of fuel cells are stacked.

12. The fuel cell according to claim 1, wherein the pole flanges (21 and 26) in the immediate vicinity of the feed and discharge openings (31, 35, 36, 37) are geometrically configured such that two ring-shaped concentric sealing areas are formed when two fuel cells are stacked, together with the membrane of one of the two fuel cells.

13. The fuel cell according to claim 12 wherein the ring-shaped clearance between the two concentric sealing areas communicates with the atmosphere through a narrow gap.

14. A battery comprising a stack of a plurality of fuel cells according to claim 1, the fuel cells being mechanically joined and electrically connected in series.

15. The battery according to claim 14, wherein the fuel cells are connected by a clamping device (61, 62).

16. The battery according to claim 14, wherein a clearance for a coolant is present between the fuel cells.

17. The battery according to claim 14, further comprising an element (65) between the fuel cells, which improves the mechanical support of fuel cells or the current transfer between the individual fuel cells or increases the thermal contact surface with the cooling medium.

* * * * *